US012767302B2

(12) United States Patent
Weber

(10) Patent No.: US 12,767,302 B2
(45) Date of Patent: Oct. 20, 2026

(54) TENSION CABLE STEERING AND ACTUATING ASSEMBLY

(71) Applicant: Steering Solutions IP Holding Corporation, Saginaw, MI (US)

(72) Inventor: John E. Weber, Pinconning, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 457 days.

(21) Appl. No.: 18/454,389

(22) Filed: Aug. 23, 2023

(65) Prior Publication Data

US 2024/0067317 A1 Feb. 29, 2024

Related U.S. Application Data

(60) Provisional application No. 63/400,246, filed on Aug. 23, 2022.

(51) Int. Cl.

| | |
|---|---|
| ***B63H 20/12*** | (2006.01) |
| ***B63H 25/02*** | (2006.01) |
| ***F16C 1/10*** | (2006.01) |
| ***F16H 19/04*** | (2006.01) |
| ***F16H 19/06*** | (2006.01) |
| *F16C 1/12* | (2006.01) |

(52) U.S. Cl.

CPC ............. *B63H 20/12* (2013.01); *B63H 25/02* (2013.01); *F16C 1/106* (2013.01); *F16H 19/04* (2013.01); *F16H 19/06* (2013.01); *B63H 2025/022* (2013.01); *F16C 1/12* (2013.01); *F16H 2019/0668* (2013.01)

(58) Field of Classification Search

CPC ... B63H 25/02; B63H 2025/022; F16C 1/106; F16H 19/06; F16H 2019/0668

See application file for complete search history.

(56) References Cited

U.S. PATENT DOCUMENTS

| | | | | |
|---|---|---|---|---|
| 5,427,555 A * | 6/1995 | Merten | .................. | B63H 25/14 114/154 |
| 10,640,190 B1 * | 5/2020 | Gonring | ................. | B63H 25/02 |

FOREIGN PATENT DOCUMENTS

| | | | |
|---|---|---|---|
| FR | 2879524 A1 * | 6/2006 | ............... G05G 7/04 |

* cited by examiner

*Primary Examiner* — Magdalena Topolski
*Assistant Examiner* — Shanna Danielle Glover
(74) *Attorney, Agent, or Firm* — Dickinson Wright PLLC

(57) ABSTRACT

A cable steering and actuation assembly includes a steering input device. The assembly also includes a first cable operatively coupled to the steering input device. The assembly further includes a second cable operatively coupled to the steering input device. The assembly yet further includes a pulley, wherein the first cable surrounds a portion of the pulley. The assembly also includes an output connector assembly operatively coupled to the first cable and the second cable, wherein a steering input by the steering input device in a first direction results in the first cable being in tension and adjusting the position of the output connector assembly, wherein a steering input by the steering input device in a second direction results in the second cable being in tension and adjusting the position of the output connector assembly.

3 Claims, 5 Drawing Sheets

TENSION CABLE STEERING AND ACTUATING ASSEMBLY

CROSS-REFERENCE TO RELATED APPLICATION

This application claims the benefits of priority to U.S. Provisional Application Ser. No. 63/400,246, filed Aug. 23, 2022, the disclosure of which is incorporated by reference herein in its entirety.

FIELD OF THE INVENTION

The embodiments described herein relate to vehicle steering systems and, more particularly, to a tension cable steering and actuating assembly.

BACKGROUND

A mechanical push-pull cable actuation device often includes an actuator attached to a lever or cable drum via a lever and/or wheel, a stranded steel cable encased within minimal space in a somewhat flexible hose/tube, and an attachment device locking the cable to the device to be actuated. The hose/tube is fixed at either end and the cable moves freely within the tube. When actuated by the wheel or lever, the cable pushes or pulls the actuated device. The device may be a steering gear, wheel linkage, rudder, outboard motor, brake lever, valve, or any other actuated device. A push-pull cable actuation device may be utilized in marine vessel steering, but uses a drum-to-lever system.

An example of steering of a marine vessel by actuating the drive motor/rudder with a cable steering system is described as follows. A drum winds or unwinds a cable depending on the direction of steering (i.e., turning of the steering wheel by operator). If the cable is wound onto the drum (wheel turned CCW) it pulls (i.e., cable in tension) the outboard motor or rudder about its pivoting axis towards the right side of the vessel and causes the vessel to turn towards the left, or port. As the cable is unwound (wheel turned CW) the outboard motor or rudder is pushed away (i.e., cable in compression) towards the left side of the vessel and thus turns the vessel to the right, or starboard direction.

When turning to port—cable in tension—the cable pulls cleanly through the hose and behaves as expected from a cable in tension. Turning to starboard puts the cable in compression and causes the cable to flex and buckle outwards and fill the free space in the hose. This may cause wear and fatigue on the hose and can even break through the sidewall, which may be a failure mode of a design relying on cable compression to act as a working load during steering maneuvers.

SUMMARY

According to one aspect of the disclosure, a cable steering and actuation assembly includes a steering input device. The assembly also includes a first cable operatively coupled to the steering input device. The assembly further includes a second cable operatively coupled to the steering input device. The assembly yet further includes a pulley, wherein the first cable surrounds a portion of the pulley. The assembly also includes an output connector assembly operatively coupled to the first cable and the second cable, wherein a steering input by the steering input device in a first direction results in the first cable being in tension and adjusting the position of the output connector assembly, wherein a steering input by the steering input device in a second direction results in the second cable being in tension and adjusting the position of the output connector assembly.

According to another aspect of the disclosure, a cable steering and actuation assembly includes a steering input device. The assembly also includes a first cable operatively coupled to the steering input device. The assembly further includes a second cable operatively coupled to the steering input device. The assembly yet further includes a first toothed rack operatively coupled to the first cable. The assembly also includes a second toothed rack operatively coupled to the second cable. The assembly further includes a gear in toothed mesh contact with the first toothed rack and the second toothed rack. The assembly yet further includes an output connector assembly operatively coupled to the second rack, wherein a steering input by the steering input device in a first direction results in the first cable being in tension to translate the first toothed rack and adjust the position of the output connector assembly, wherein a steering input by the steering input device in a second direction results in the second cable being in tension to translate the second toothed rack and adjust the position of the output connector assembly.

According to yet another aspect of the disclosure, a method of steering a marine vessel is provided. The method includes applying a steering input via a steering input device in a first direction to dispose a first cable into tension to adjust a position of an output connector assembly which is operatively coupled to an outboard motor of a marine vessel. The method also includes applying a steering input via the steering input device in a second direction to dispose a second cable into tension to adjust the position of the output connector assembly.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

The following discussion is directed to various embodiments of the disclosure. Although one or more of these embodiments may be described in more detail than others, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The embodiments disclosed herein relate to a cable actuation assembly. Numerous contemplated applications in a variety of industries may benefit from the disclosed embodiments. For example, steering systems in marine vessels may incorporate a cable actuation assembly therein. However, it is to be understood that other vehicles may utilize the cable actuation assembly. Such vehicles may include a car, a truck, a sport utility vehicle, a mini-van, a crossover, any other passenger vehicle, any suitable commercial vehicle, planes, tractors, boats, or other suitable vehicles.

Figure 1:
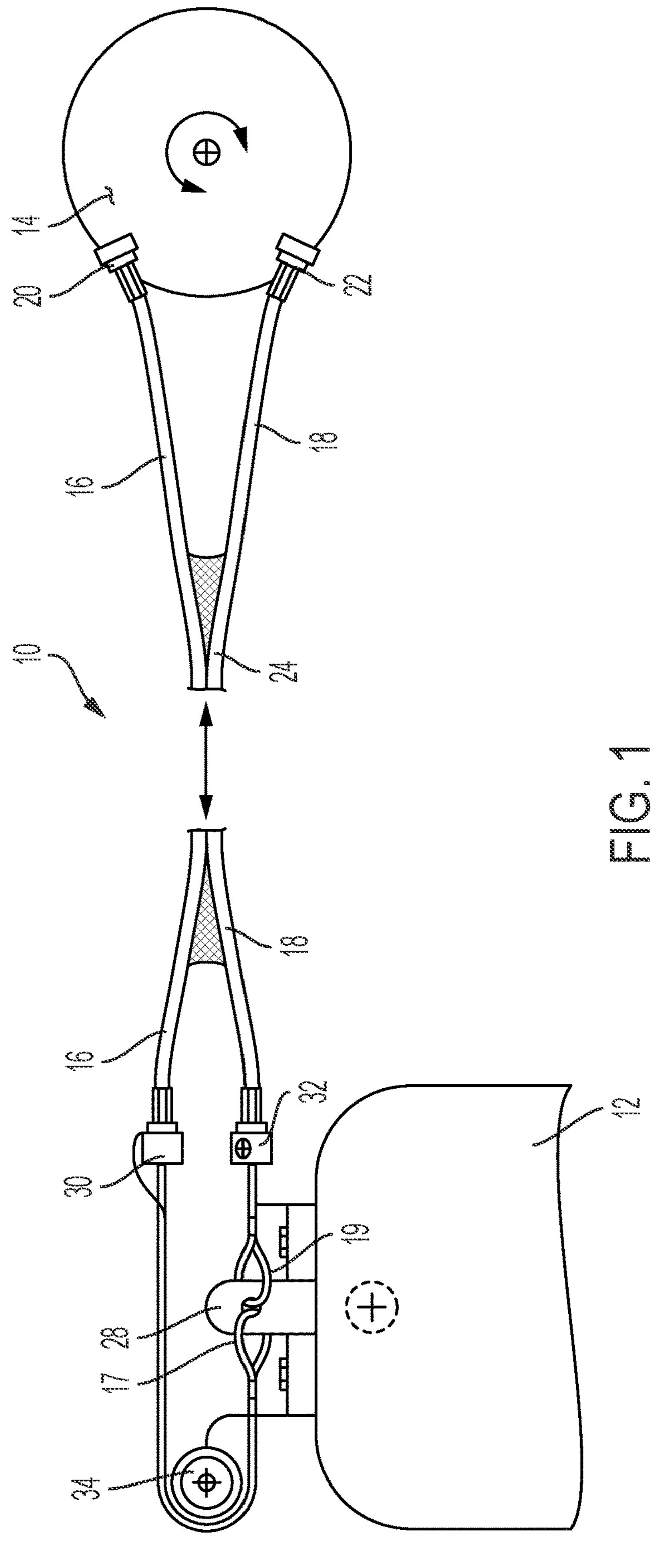
FIG. 1 schematically illustrates a tension cable steering and actuating assembly.

Referring to FIG. 1, a cable steering and actuation assembly is illustrated and generally referenced with numeral 10. In the illustrated embodiment, the cable steering and actuation assembly 10 is used to maneuver an outboard motor 12 of a marine vessel to steer the marine vessel. As shown, a steering input device 14, such as a steering wheel or component operatively coupled to the steering input device, is accessible to an operator for steering input. The steering input device 14 is operatively coupled to a first cable 16 and a second cable 18 at different positions of the steering input device 14. In particular, the first cable 16 and the second cable 18 have respective first ends 20, 22 coupled to the steering input device 14 to secure each cable 16, 18 thereto. The coupling may be made in any suitable manner that ensures securement thereto.

The first cable 16 and the second cable 18 extend along a portion of the marine vessel and may be enclosed within a protective sheath 24 and/or other housing structure. Each of the first cable 16 and the second cable 18 have a respective second end operatively coupled to an output connector assembly 28. Specifically, the first cable 16 has a second end 17 connected to the output connector assembly 28 and the second cable 18 has a second end 19 connected to the output connector assembly 28. In the embodiment of FIG. 1, the second ends 17, 19 of the first cable 16 and the second cable 18 are tied or looped with the output connector assembly 28 to secure each cable 16, 18 thereto. It is to be appreciated that other types of connections between the second ends of the cables 16, 18 and the output connector assembly 28 are contemplated. One or both of the cables 16, 18 may be secured in a desired location with other structural components, such as blocks or the like 30, 32, such as those illustrated. The connection of each of the first cable 16 and the second cable 18 to the output connector assembly 28 may be made in any suitable manner that ensures securement thereto. As shown, the first cable 16 extends around a pulley 34.

The output connector assembly 28 is operatively coupled to the outboard motor 12, such that translation of the output connector assembly 28—or a portion thereof—results in a change in angular position of the outboard motor 12, thereby steering the marine vessel over a range of angular positions.

Due to the above-described structural relationship between the components, any steering input results in one of the cables 16, 18 functioning as the working cable and being in tension to maneuver the output connector assembly 28. This occurs regardless of the steering input direction and as the actuation direction changes. While the non-working cable will be in compression, it is only to an extent of maintaining position and removing slack. The compression cable side will not do work and therefore wear issues for the housing/tube will be significantly reduced and/or eliminated.

Figure 2:
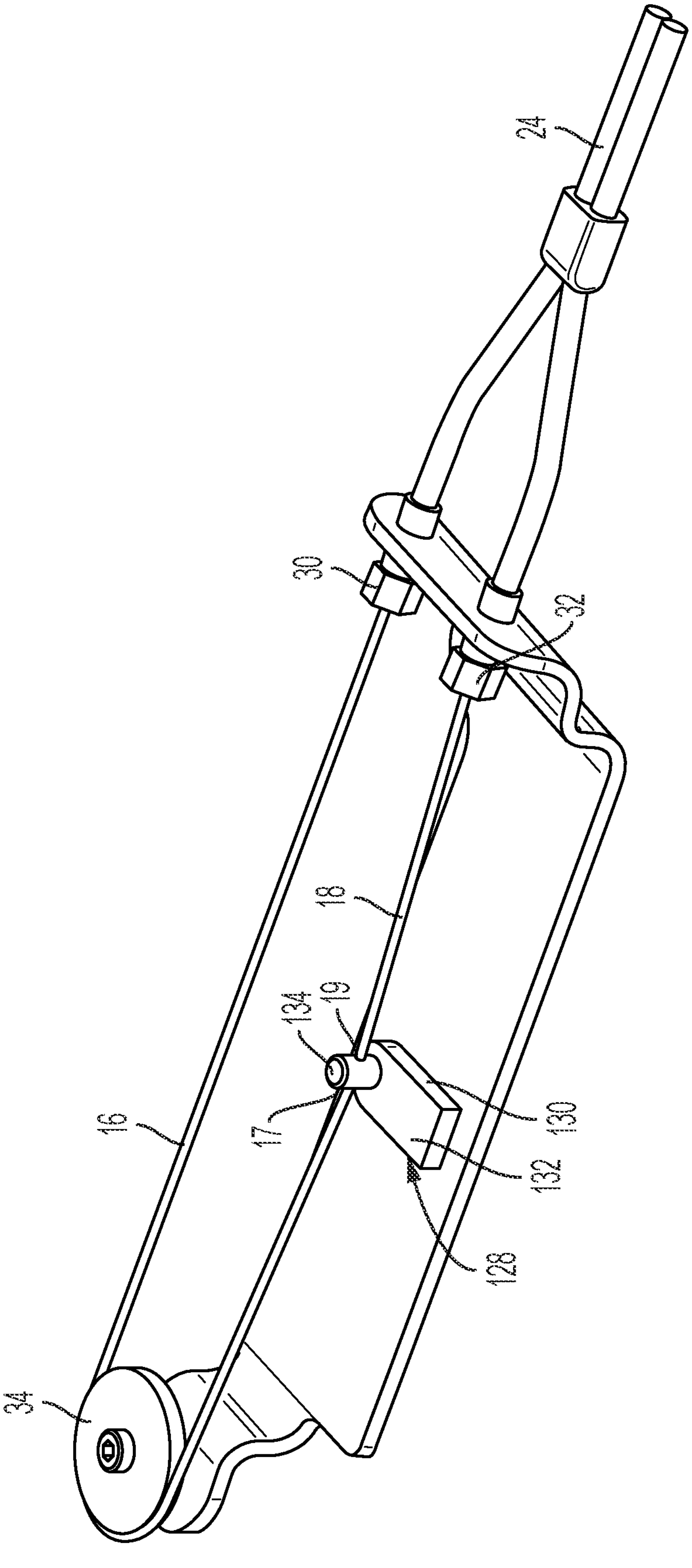
FIG. 2 is a perspective view of the tension cable steering and actuating assembly with an output connector assembly according to one aspect of the disclosure.
Figure 3:
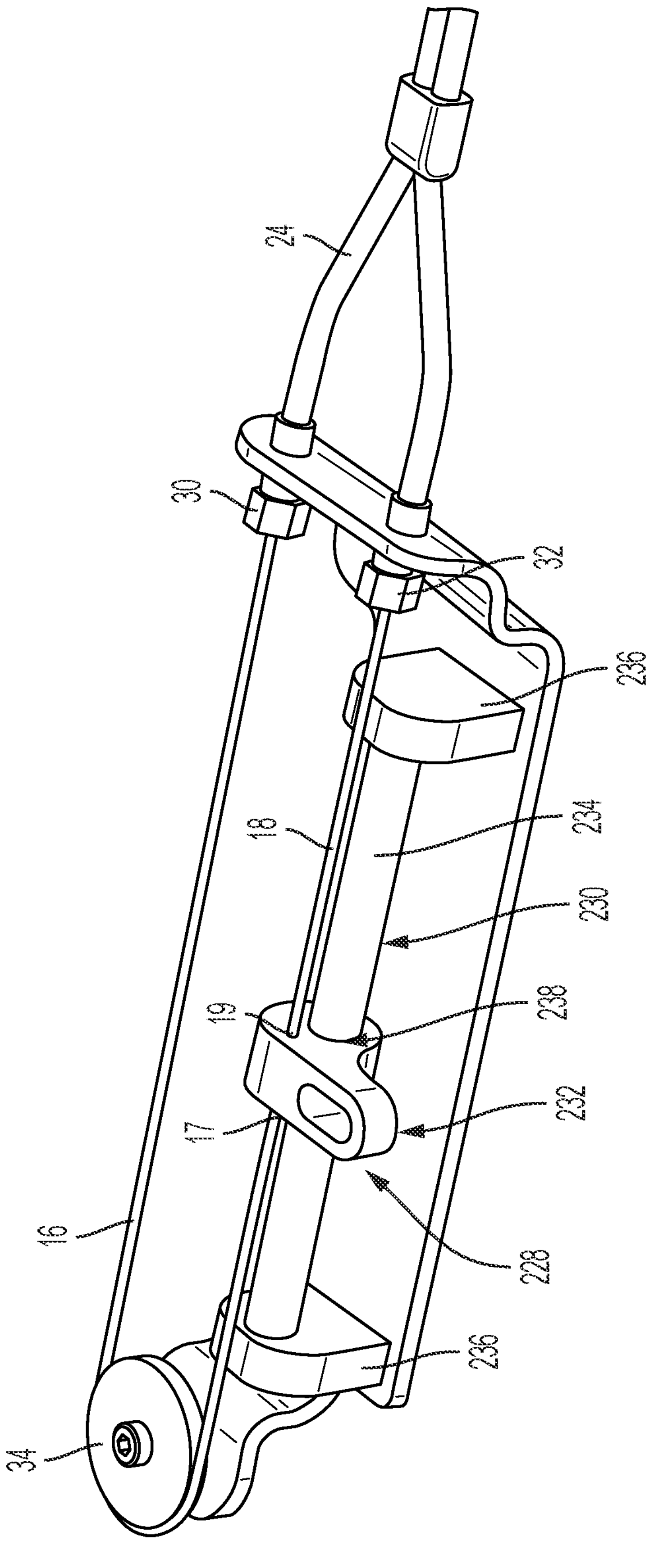
FIG. 3 is a perspective view of the tension cable steering and actuating assembly with an output connector assembly according to another aspect of the disclosure.
Figure 4:
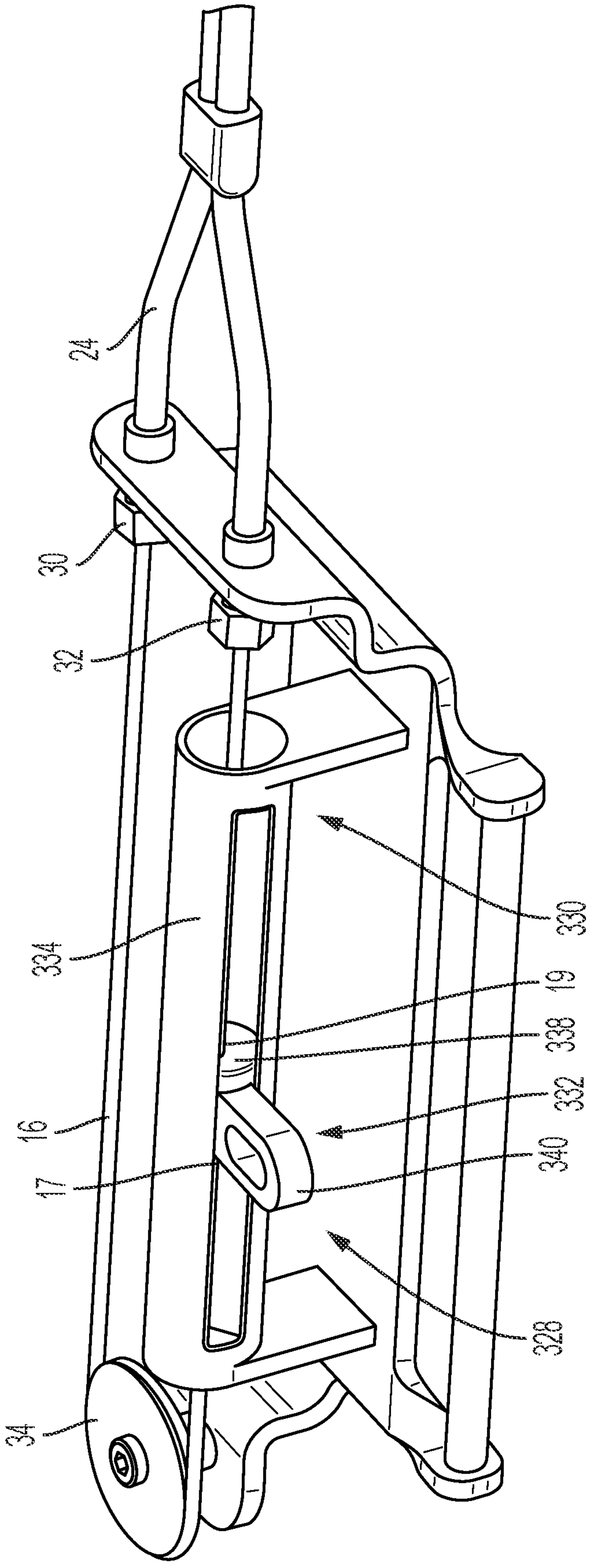
FIG. 4 is a perspective view of the tension cable steering and actuating assembly with an output connector assembly according to another aspect of the disclosure.

The illustrated embodiment of FIG. 1 shows a general embodiment that utilizes a pulley system. FIGS. 2-4 illustrate alternative embodiments of output connector assemblies and connections of the cables thereto. The embodiments work with a pulley-cable system, as described herein in connection with FIG. 1, and are described herein.

Referring now to FIG. 2, the first cable 16 extends around the pulley 34 and is connected to an output connector assembly 128 at the second end 17 of the first cable 16. The second cable 18 does not extend around the pulley 34 and is connected to the output connector assembly 128 at the second end 19 of the second cable 18. In the illustrated embodiment, the output connector assembly 128 includes a slider member 130. The slider member 130 includes a base portion 132. A pin 134 extends from the base portion 132 of the slider member 130. The second ends 17, 19 of the cables 16, 18 are connected to the pin 134. The slider member 130 is operatively coupled to the outboard motor 12. Each cable 16, 18 is configured to operate in tension when pulling on the pin 134, thereby actuating a steering maneuver.

Referring now to FIG. 3, the first cable 16 extends around the pulley 34 and is connected to an output connector assembly 228 at the second end 17 of the first cable 16. The second cable 18 does not extend around the pulley 34 and is connected to the output connector assembly 228 at the second end 19 of the second cable 18. In the illustrated embodiment, the output connector assembly 228 includes a guiding structure 230 and a slider member 232. The guiding structure 230 includes a guide bar 234 extending between two mounting members 236. The slider member 232 defines an aperture 238 which surrounds the guide bar 234 and allows the slider member 232 to translate along the guide bar 234 during steering maneuvers. The second ends 17, 19 are connected to the slider member 232. The slider member 232 is operatively coupled to the outboard motor 12 in any suitable manner. Each cable 16, 18 is configured to operate in tension when pulling on the slider member 232, thereby actuating a steering maneuver.

Referring now to FIG. 4, the first cable 16 extends around the pulley 34 and is connected to an output connector assembly 328 at the second end 17 of the first cable 16. The second cable 18 does not extend around the pulley 34 and is connected to the output connector assembly 328 at the second end 19 of the second cable 18. In the illustrated embodiment, the output connector assembly 328 includes a guiding structure 330 and a slider member 332. The guiding structure 330 includes a guide tube 334 extending between two mounting members 336. The slider member 332 includes a main body portion 338 having an outer surface corresponding to the geometry of the inner walls of the guide tube 334. For example, the main body portion 338 may have a substantially cylindrical geometry to match an annular inner wall of the guide tube 334. The corresponding geometry of the main body portion 338 and the guide tube 334 allows the slider member 332 to translate within the guide tube 334 during steering maneuvers. The second ends 17, 19 are connected to the slider member 332. The slider member 332 is operatively coupled to the outboard motor 12 in any suitable manner, including with a connector portion 340 of the slider member 332, which protrudes through a slot defined along the guide tube 334, as shown in FIG. 4. Each cable 16, 18 is configured to operate in tension when pulling on the slider member 332, thereby actuating a steering maneuver.

Figure 5:
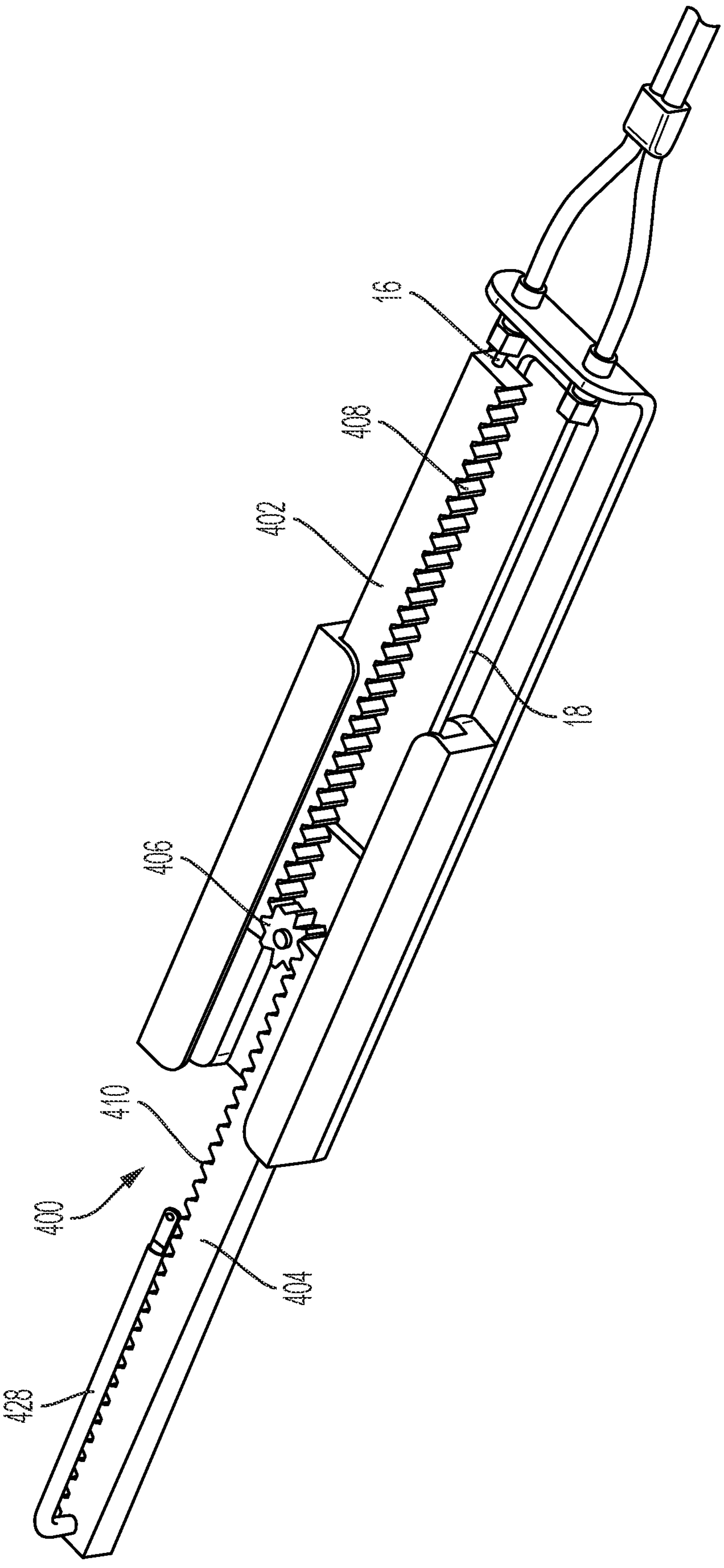
FIG. 5 is a perspective view of the tension cable steering and actuating assembly with an output connector assembly according to another aspect of the disclosure.

As an alternative to a pulley-cable system, FIG. 5 illustrates a toothed rack assembly which is referenced generally with numeral 400. In particular, a pair of racks—specifically a first rack 402 and a second rack 404—is provided and operatively connected with a gear 406, such as a pinion located between the racks 402, 404 and in meshed engagement with teeth 408, 410 of each rack 402, 404, respectively. The first rack 402 is operatively coupled to, and controlled by, the first cable 16, while the second rack 404 is operatively coupled to, and controlled by, the second cable 18. The working cable pulls the connected rack and the translation of the rack results in maneuvering of an output connector assembly 428—either directly by the second rack 404 or indirectly via the first rack 402, the gear 406 and the second rack 404. In both operational cases, the associated cable performing the work is in tension.

The embodiments disclosed herein ensure that the "working" (i.e., loaded) cable is in tension. As the direction of actuation changes, the opposite cable becomes the working cable in tension. This design allows for reduced cable and tubing size, as well as increased lifespan in any high-load type application.

While the invention has been described in detail in connection with only a limited number of embodiments, it is to be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Moreover, any feature, element, component or advantage of any one embodiment can be used on any of the other embodiments. Accordingly, the invention is not to be seen as limited by the foregoing description.

What is claimed is:

1. A cable steering and actuation assembly comprising:
- a steering input device;
- a first cable operatively coupled to the steering input device;
- a second cable operatively coupled to the steering input device;
- a first toothed rack operatively coupled to the first cable;
- a second toothed rack operatively coupled to the second cable;
- wherein the first cable has a first end operatively coupled to the steering input device and a second end operatively coupled to an end of the first toothed rack, and wherein the second cable has a first end operatively coupled to the steering input device and a second end operatively coupled to an end of the second toothed rack;
- a gear in toothed mesh contact with the first toothed rack and the second toothed rack; and
- an output connector assembly operatively coupled to the second rack, wherein a steering input by the steering input device in a first direction results in the first cable being in tension to translate the first toothed rack and adjust the position of the output connector assembly, wherein a steering input by the steering input device in a second direction results in the second cable being in tension to translate the second toothed rack and adjust the position of the output connector assembly.

2. The cable steering and actuation assembly of claim 1, further comprising an outboard motor of a marine vessel, the outboard motor operatively coupled to the output connector assembly.

3. The cable steering and actuation assembly of claim 1, wherein the gear is a pinion.

* * * * *